(12) United States Patent
Weismantel et al.

(10) Patent No.: US 9,738,769 B2
(45) Date of Patent: Aug. 22, 2017

(54) WATER-ABSORBING POLYMER PARTICLES WITH HIGH FREE SWELL RATE AND HIGH PERMEABILITY

(71) Applicant: BASF SE, Ludwigshafen (DE)

(72) Inventors: Matthias Weismantel, Jossgrund-Oberndorf (DE); Ulrich Riegel, Landstuhl (DE); Thomas Gieger, Ludwigshafen (DE); Markus Braun, Heidelberg (DE); Michael A. Mitchell, Waxhaw, NC (US)

(73) Assignee: BASF SE, Ludwigshafen (DE)

( * ) Notice: Subject to any disclaimer, the term of this patent is extended or adjusted under 35 U.S.C. 154(b) by 537 days.

(21) Appl. No.: 13/763,029

(22) Filed: Feb. 8, 2013

(65) Prior Publication Data

US 2013/0210947 A1    Aug. 15, 2013

Related U.S. Application Data

(60) Provisional application No. 61/598,920, filed on Feb. 15, 2012.

(51) Int. Cl.
*C08J 9/14* (2006.01)
*C08G 18/63* (2006.01)
(Continued)

(52) U.S. Cl.
CPC . *C08J 9/18* (2013.01); *C08J 9/06* (2013.01); *C08J 9/14* (2013.01); *C08J 9/16* (2013.01);
(Continued)

(58) Field of Classification Search
USPC .................. 524/700, 789; 252/194
See application file for complete search history.

(56) References Cited

U.S. PATENT DOCUMENTS

| 6,060,557 A * | 5/2000 | Dahmen et al. ............... 524/556 |
| 6,623,848 B2 * | 9/2003 | Brehm .................... A61L 15/18 |
| | | 162/175 |

(Continued)

FOREIGN PATENT DOCUMENTS

| AT | 391321 B † | 9/1990 |
| DE | 38 31 261 A1 | 3/1990 |

(Continued)

OTHER PUBLICATIONS

Buchholz, Fredric L., et al. *Modern Superabsorbent Polymer Technology*, "Commercial Processes for the Manufacture of Superabsorbent Polymers." New York: John Wiley & Sons, Inc., 1998, pp. 71-103.

(Continued)

*Primary Examiner* — Peter D Mulcahy
*Assistant Examiner* — Henry Hu
(74) *Attorney, Agent, or Firm* — Marshall, Gerstein & Borun LLP

(57) ABSTRACT

A process for producing water-absorbing polymer particles with high free swell rate and high permeability by polymerization of an aqueous monomer solution or suspension to give an aqueous polymer gel, wherein a thermal blowing agent essentially free of inorganic acid anions is mixed into the polymer gel, and subsequent thermal drying of the polymer gel.

8 Claims, 1 Drawing Sheet

(51) Int. Cl.
*C08J 9/18* (2006.01)
*C08J 9/06* (2006.01)
*C08J 9/16* (2006.01)

(52) U.S. Cl.
CPC ........ *C08J 2300/14* (2013.01); *C08J 2333/08* (2013.01); *C08J 2333/14* (2013.01)

(56) References Cited

U.S. PATENT DOCUMENTS

| | | | |
|---|---|---|---|
| 7,163,966 | B2 † | 1/2007 | Joy |
| 7,786,211 | B2 * | 8/2010 | Stueven et al. ............... 524/700 |
| 8,076,436 | B2 | 12/2011 | Braig et al. |
| 8,349,946 | B2 * | 1/2013 | Stueven et al. ............... 524/700 |
| 2002/0128618 | A1 | 9/2002 | Frenz et al. |
| 2002/0165288 | A1 | 11/2002 | Frenz et al. |
| 2010/0190932 | A1 † | 7/2010 | Riegel |
| 2011/0118430 | A1 * | 5/2011 | Funk et al. ................ 526/317.1 |
| 2011/0136986 | A1 | 6/2011 | Elliott et al. |
| 2011/0303872 | A1 * | 12/2011 | Herfert et al. ................ 252/194 |
| 2012/0001122 | A1 | 1/2012 | Wattebled et al. |
| 2012/0232177 | A1 | 9/2012 | Lopez Villanueva et al. |
| 2013/0101851 | A1 | 4/2013 | Takaai et al. |
| 2013/0338328 | A1 * | 12/2013 | Krauss et al. ............. 526/318.5 |

FOREIGN PATENT DOCUMENTS

| | | |
|---|---|---|
| EP | 2 399 944 A1 | 12/2011 |
| JP | 2002282687 A | 10/2002 |
| JP | 2009052009 A | 3/2009 |
| WO | WO-2008/046841 A1 | 4/2008 |
| WO | WO-2010/018143 A1 | 2/2010 |
| WO | WO-2011/061315 A1 | 5/2011 |
| WO | WO-2011/078298 A1 | 6/2011 |
| WO | WO-2011/126079 A1 | 10/2011 |
| WO | WO-2012/143235 A1 | 10/2012 |

OTHER PUBLICATIONS

International Search Report in international application No. PCT/EP2013/052153, dated Apr. 2, 2013 (translation).

Third Party Observation in international application No. PCT/EP2013/052153, dated Dec. 8, 2013.

Third Party Observation in international application No. PCT/EP2013/052153, dated Jun. 13, 2014.

* cited by examiner
† cited by third party

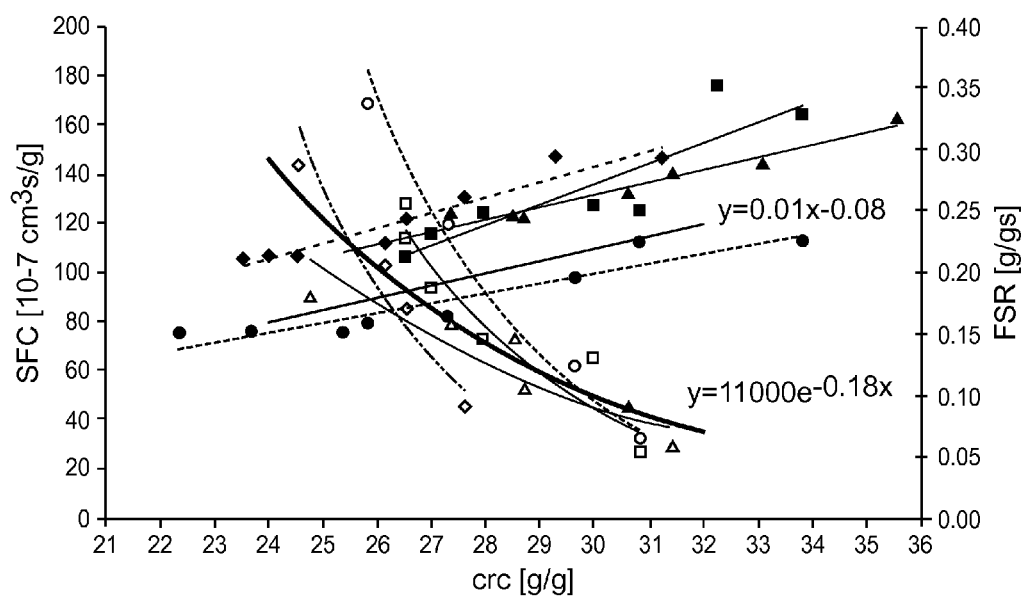

WATER-ABSORBING POLYMER PARTICLES WITH HIGH FREE SWELL RATE AND HIGH PERMEABILITY

CROSS-REFERENCE TO RELATED APPLICATIONS

This application claims the benefit of U.S. provisional patent application No. 61/598,920, filed Feb. 15, 2012, incorporated herein by reference in its entirety.

The present invention relates to a process for producing water-absorbing polymer particles with high free swell rate and high permeability by polymerizing an aqueous monomer solution or suspension to give an aqueous polymer gel, wherein a thermal blowing agent essentially free of inorganic acid anions is mixed into the polymer gel, and subsequent thermal drying of the polymer gel.

Water-absorbing polymer particles are used to produce diapers, tampons, sanitary napkins and other hygiene articles, but also as water-retaining agents in market gardening. The water-absorbing polymer particles are also referred to as superabsorbents.

The production of water-absorbing polymer particles is described in the monograph "Modern Superabsorbent Polymer Technology", F. L. Buchholz and A. T. Graham, Wiley-VCH, 1998, pages 71 to 103.

There is an increasing tendency to make hygiene articles, such as diapers, incontinence articles and sanitary napkins, thinner and to reduce the proportion of voluminous fluff, for example cellulose fibers. One task of the fluff is that of liquid transportation in the diaper; the water-absorbing polymer particles must therefore, as well as the absorption and storage of the liquids, also increasingly fulfill further tasks, for example rapid absorption, transportation and distribution of the liquids.

Properties of the water-absorbing polymer particles can be adjusted, for example, via the amount of crosslinker used. With an increasing amount of crosslinker, the centrifuge retention capacity (CRC) falls and the absorption under a pressure of 21.0 g/cm$^2$ (AUL0.3 psi) passes through a maximum.

For a further improvement in the use properties of the water-absorbing polymer particles, for example in the permeability of the swollen gel bed (SFC) in the diaper and absorption under a pressure of 49.2 g/cm$^2$ (AUL0.7 psi), water-absorbing polymer particles are generally surface postcrosslinked. This increases the level of crosslinking of the particle surface, which can at least partly decouple the absorption under a pressure of 49.2 g/cm$^2$ (AUL0.7 psi) and the centrifuge retention capacity (CRC). This surface postcrosslinking can be performed in aqueous gel phase. Preferably, however, dried, ground and sieved polymer particles (base polymer) are surface coated with a surface postcrosslinker and thermally surface postcrosslinked. Crosslinkers suitable for that purpose are compounds which can form covalent bonds to at least two carboxylate groups of the water-absorbing polymer particles.

In addition, high proportions of unconverted monomers in the production of water-absorbing polymer particles, called residual monomers, may be of toxicological concern. In order to reduce the residual monomer content, WO 2010/018143 uses, for example, a salt of urea with an inorganic acid.

Furthermore, in order to ensure rapid liquid absorption, the free swell rate of the water-absorbing polymer particles can be increased. This is described, for example, in DE 38 31 261.

However, an excessively high free swell rate has an adverse effect on the permeability of the swollen gel bed (SFC), the latter being lowered such that, in the case of use in diapers, for example, this increases the risk of gel blocking and hence promotes leakage of the diaper.

In addition, when, for example, urea is introduced into the monomer solution, the resulting water-absorbing polymer particles become more porous and thus less stable. They can therefore break up easily in the course of use or processing, and thus also lose their use properties and hence their ability to function.

It was therefore an object of the present invention to provide improved water-absorbing polymer particles which have a high free swell rate (FSR) coupled with high permeability of the gel bed (SFC) and high CRC. It was another object of the present invention to provide water-absorbing particles which, in the course of use and/or processing, retain their use properties and hence their ability to function.

BRIEF DESCRIPTION OF THE DRAWING

FIG. 1 is a graph of SFC (10$^{-7}$ cm$^3$s/g) and FSR (g/gs) versus CRC (g/g).

The inventive water-absorbing polymer particles are prepared by polymerization of an aqueous monomer solution or suspension comprising
 a) at least one ethylenically unsaturated monomer which bears acid groups and may be at least partly neutralized,
 b) at least one crosslinker,
 c) at least one initiator,
 d) optionally one or more ethylenically unsaturated monomers copolymerizable with the monomers mentioned under a) and
 e) optionally one or more water-soluble polymers,
to give an aqueous polymer gel, the thermal drying of the polymer gel, the comminution of the dried polymer gel to polymer particles and the classification of the resulting polymer particles, wherein a thermal blowing agent essentially free of inorganic acid anions is mixed into the aqueous polymer gel.

The monomers a) are preferably water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

According to the invention, monomer a) may be neutralized to an extent of 20 to 85 mol %, preferably 30 to 80 mol %.

The proportion of acrylic acid and/or salts thereof in the total amount of monomers a) is preferably at least 50 mol %, more preferably at least 80 mol %, most preferably at least 90 mol %.

Most preferably, monomer a) is acrylic acid to an extent of at least 90 mol % and/or monomer a) has been neutralized to an extent of 30 to 80 mol %.

The acrylic acid used typically comprises polymerization inhibitors, preferably hydroquinone monoethers, as storage stabilizers.

The monomer solution therefore comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight of hydroquinone monoether, based in each case on the unneutralized acrylic acid. For example, the monomer solution can be prepared by using an acrylic acid with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the acrylic acid. In addition, polyvalent metal salts which can form coordinate bonds with at least two acid groups of the acrylic acid are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight and more preferably 0.1 to 1% by weight, based in each case on the unneutralized monomer a). With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with acrylic acid are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess acrylic acid, for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. To improve the drying properties, the comminuted polymer gel obtained by means of a kneader can additionally be extruded.

Polymerization on the belt is described, for example, in DE 38 25 366 A1 and U.S. Pat. No. 6,241,928. Polymerization in a belt reactor forms a polymer gel which has to be comminuted in a further process step, for example in an extruder or kneader.

According to the invention, a thermal blowing agent is mixed into the polymer gel prior to drying.

This is preferably accomplished by means of a kneader or extruder.

When the polymerization is performed in a kneader, the thermal blowing agent can be added after at least 50% of the residence time, preferably after at least 60% of the residence time and more preferably after at least 75% of the residence time in the kneader.

According to the invention, the blowing agent is fed in in a zone of the kneader in which the polymerization has not yet ended. The degree of polymerization of the gel in this zone is 10-99.9%, preferably 55-99.5% and more preferably 90-99%.

According to the invention, the blowing agent can also not be added until after the polymerization, during the comminution of the polymer gel in the extruder. For example, in the case of performance of a polymerization on a belt, the blowing agent is added in the subsequent process step, during the comminution of the polymer gel in the extruder.

The amount of the blowing agent added, based on the unneutralized monomer a), is 0.1-10% by weight, preferably 0.2-5% by weight and more preferably 0.5-2.5% by weight.

Suitable thermal blowing agents are azo compounds, for example azodicarbonamide, azobisisobutyronitrile and diazoaminobenzenes, acrylic acid compounds of azo compounds comprising amino groups, nitro compounds, for example nitrourea, nitroso compounds such as dinitrosopentamethylenetetramine, carbonates, for example sodium carbonate, ammonium carbonate, or hydrazines, sulfohydrazides, triazine compounds, sulfonylsemicarbazides, guanidine derivatives, for example aminoguanidine carbonate and urea; urea is particularly suitable.

Particularly preferred blowing agents are essentially free of inorganic acid anions, i.e. blowing agents comprising less than 10 mol % of inorganic acid anions.

Inorganic acid anions in the context of this invention are only anions of the strong mineral acids, such as sulfuric acid, phosphoric acid, nitric acid. The inorganic acid anions may be present as a counterion of the blowing agent, for example phosphate in ureaphosphate.

The permeability of water-absorbing polymer particles is lower in the case of use of blowing agents with inorganic acid anions than in the case of blowing agents essentially free of inorganic acid anions.

It is assumed that inorganic acid anions are converted to the corresponding acids, and the inorganic acids thus obtained influence the number of crosslinking sites, especially on the surface of the water-absorbing polymer particles, by destroying ester bonds of the surface postcrosslinking compounds or preventing the formation thereof in the postcrosslinking reaction.

It is additionally also possible that inorganic acids destroy ester bonds in the internal crosslinker and thus influence the degree of crosslinking in the interior of the particles.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 20 to 85 mol % and more preferably from 30 to 80 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then preferably dried with a belt drier until the residual moisture content is preferably 0.5 to 15% by weight, more preferably 1 to 10% by weight and most preferably 2 to 8% by weight, the residual moisture content being determined by EDANA recommended test method No. WSP 230.2-05 "Moisture Content—Weight Loss Upon Heating". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

According to the invention, the thermal drying is effected at a temperature above the decomposition temperature of the thermal blowing agent. Under the influence of heat, the thermal blowing agent releases gases (e.g. $N_2$, in the case of urea $CO_2$ and $NH_3$), which thus lead to pore formation in the polymer gel.

Thereafter, the dried polymer gel is ground and classified, and the apparatus used for grinding may typically be single or multistage roll mills, preferably two or three-stage roll mills, pin mills, hammer mills or vibratory mills.

The mean particle size of the water-absorbing polymer particles is preferably at least 200 μm, more preferably from 250 to 600 μm and very particularly from 300 to 500 μm. The mean particle size can be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles having a particle size of greater than 150 μm is preferably at least 90% by weight, more preferably at least 95% by weight and most preferably at least 98% by weight.

Polymer particles with too small a particle size lower the permeability (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated for, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 μm is preferably at least 90% by weight, more preferably at least 95% by weight, most preferably at least 98% by weight.

The proportion of particles having a particle size of 150 to 850 μm is preferably at least 90% by weight, more preferably at least 95% by weight and most preferably at least 98% by weight.

Polymer particles of excessively large particle size lower the free swell rate. The proportion of excessively large polymer particles should therefore likewise be small.

Excessively large polymer particles are therefore typically removed and recycled into the grinding of the dried polymer gel.

To further improve the properties, the classified polymer particles can be surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1,2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyl-2-oxazolidinone, 2-oxazolidinone and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are hydroxide, chloride, bromide, sulfate, hydrogensulfate, carbonate, hydrogencarbonate, nitrate, phosphate, hydrogenphosphate, dihydrogenphosphate and carboxylate, such as acetate, citrate and lactate. Salts with different counterions are also possible, for example basic aluminum salts such as aluminum monoacetate or aluminum monolactate. Aluminum sulfate, aluminum monoacetate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spray application, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal drying is preferably carried out in contact driers, more preferably paddle driers, most preferably disk driers. Suitable driers are, for example, Hosokawa Bepex® Horizontal Paddle Dryers (Hosokawa Micron GmbH; Leingarten; Germany), Hosokawa Bepex® Disc Dryers (Hosokawa Micron GmbH; Leingarten; Germany), Holo-Flite® driers (Metso Minerals Industries Inc.; Danville; USA) and Nara Paddle Dryers (NARA Machinery Europe; Frechen; Germany). Moreover, fluidized bed driers may also be used.

The drying can be effected in the mixer itself, by heating the jacket or blowing in warm air. Equally suitable is a downstream dryer, for example a shelf drier, a rotary tube oven or a heatable screw. It is particularly advantageous to effect mixing and drying in a fluidized bed drier.

Preferred drying temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

In a preferred embodiment of the present invention, the water-absorbing polymer particles are cooled after the thermal drying. The cooling is preferably performed in contact coolers, more preferably paddle coolers and most preferably disk coolers. Suitable coolers are, for example, Hosokawa Bepex® Horizontal Paddle Cooler (Hosokawa Micron GmbH; Leingarten; Germany), Hosokawa Bepex® Disc Cooler (Hosokawa Micron GmbH; Leingarten; Germany), Holo-Flite® coolers (Metso Minerals Industries Inc.; Danville; USA) and Nara Paddle Cooler (NARA Machinery Europe; Frechen; Germany). Moreover, fluidized bed coolers may also be used.

In the cooler, the water-absorbing polymer particles are cooled to 20 to 150° C., preferably 30 to 120° C., more preferably 40 to 100° C. and most preferably 50 to 80° C.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized.

The remoisturizing is preferably performed at 30 to 80° C., more preferably at 35 to 70° C., most preferably at 40 to 60° C. At excessively low temperatures, the water-absorbing polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging. The remoisturizing is advantageously performed in the cooler after the thermal drying.

Suitable coatings for improving the free swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The inventive water-absorbing polymer particles have a centrifuge retention capacity (CRC), a free swell rate (FSR) and a permeability (SFC) which meet the conditions $$FSR[g/gs] \geq 0.01 \cdot CRC[g/g] - 0.08$$

and $$SFC/[10^{-7} \cdot cm^3 s/g] \geq 11000 \cdot \exp(-0.18 \cdot CRC[g/g])$$

The water-absorbing polymer particles have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the water-absorbing polymer particles is typically less than 60 g/g. The centrifuge retention capacity (CRC) is determined by EDANA recommended test method No. WSP 241.2-05 "Gravimetric Determination of Fluid Retention Capacity in Saline, After Centrifugation".

The water-absorbing polymer particles have a free swell rate (FSR) of at least 0.20 g/gs, preferably of at least 0.25 g/gs and most preferably of at least 0.30 g/gs.

The inventive water-absorbing polymer particles have a permeability (SFC) of at least $80 \times 10^{-7}$ cm$^3$s/g, preferably of at least $100 \times 10^{-7}$ cm$^3$s/g and most preferably of at least $130 \times 10^{-7}$ cm$^3$s/g. The permeability is typically less than $500 \times 10^{-7}$ cm$^3$s/g.

The present invention further provides hygiene articles comprising the inventive water-absorbing polymer particles.

The hygiene articles typically comprise a water-impervious backside, a water-pervious topside and an intermediate absorbent core composed of the inventive water-absorbing polymer particles and optionally fibers. The core preferably comprises only water-absorbing polymer particles. The proportion of the inventive water-absorbing polymer particles in the absorbent core is 20 to 100% by weight and preferably 90 to 100% by weight.

Methods:

The standard test methods described hereinafter and designated "WSP" are described in: "Standard Test Methods for the Nonwovens Industry", 2005 edition, published jointly by the Worldwide Strategic Partners EDANA (Avenue Eugene Plasky, 157, 1030 Brussels, Belgium, www.edana.org) and INDA (1100 Crescent Green, Suite 115, Cary, N.C. 27518, USA, www.inda.org). This publication is available both from EDANA and from INDA.

The measurements should, unless stated otherwise, be conducted at an ambient temperature of 23±2° C. and a relative air humidity of 50±10%. The water-absorbing polymer particles are mixed thoroughly before the measurement.

Residual Monomers

The residual monomer content of the water-absorbing polymer particles is determined by EDANA recommended test method No. WSP 210.2-04 "Determination of the Amount of Residual Monomers".

Moisture Content

The moisture content of the water-absorbing polymer particles is determined by EDANA recommended test method No. WSP 230.2-05 "Moisture Content—Weight Loss Upon Heating".

Centrifuge Retention Capacity

The centrifuge retention capacity (CRC) is determined by EDANA recommended test method No. WSP 241.2-05

"Gravimetric Determination of Fluid Retention Capacity in Saline Solution, After Centrifugation".

Absorption Under a Pressure of 21.0 g/cm² (Absorption Under Load)

The absorption under a pressure of 21.0 g/cm² (AUL0.3 psi) of the water-absorbing polymer particles is determined by EDANA recommended test method No. WSP 242.2-05 "Gravimetric Determination of Absorption Under Pressure".

Absorption Under a Pressure of 49.2 g/cm² (Absorption Under Load)

The absorption under a pressure of 49.2 g/cm² (AUL0.7 psi) is determined analogously to EDANA recommended test method No. WSP 242.2-05 "Gravimetric Determination of Absorption Under Pressure", except that a pressure of 49.2 g/cm² (AUL0.7 psi) is established instead of a pressure of 21.0 g/cm² (AUL0.3 psi).

Extractables

The content of extractables of the water-absorbing polymer particles is determined by EDANA recommended test method No. WSP 270.2-05 "Determination of Extractable Polymer Content by Potentiometric Titration".

Free Swell Rate

To determine the free swell rate (FSR), 1.00 g (=W1) of the water-absorbing polymer particles is weighed into a 25 ml beaker and distributed homogeneously over its base. Then 20 ml of a 0.9% by weight sodium chloride solution are metered into a second beaker by means of a dispenser and the contents of this beaker are added rapidly to the first and a stopwatch is started. As soon as the last drop of salt solution has been absorbed, which is recognized by the disappearance of the reflection on the liquid surface, the stopwatch is stopped. The exact amount of liquid which has been poured out of the second beaker and absorbed by the polymer in the first beaker is determined accurately by reweighing the second beaker (=W2). The time interval required for the absorption, which has been measured with the stopwatch, is designated as t. The disappearance of the last liquid droplet on the surface is determined as the time t.

The free swell rate (FSR) is calculated therefrom as follows:

$$FSR\ [g/g\ s] = W2/(W1 \times t)$$

If the moisture content of the water-absorbing polymer particles, however, is more than 3% by weight, the weight W1 should be corrected to take account of this moisture content.

Permeability (Saline Flow Conductivity)

The permeability (SFC) of a swollen gel layer under a pressure of 0.3 psi (2070 Pa) is, as described in EP 0 640 330 A1, determined as the gel layer permeability of a swollen gel layer of water-absorbing polymer particles, the apparatus described on page 19 and in FIG. 8 in the aforementioned patent application having been modified such that the glass frit (40) is not used, and the plunger (39) consists of the same polymer material as the cylinder (37) and now comprises 21 bores of equal size distributed homogeneously over the entire contact area. The procedure and evaluation of the measurement remain unchanged from EP 0 640 330 A1. The flow is detected automatically.

The permeability (SFC) is calculated as follows:

$$SFC\ [cm^3 s/g] = (Fg(t=0) \times L0)/(d \times A \times WP)$$

where Fg(t=0) is the flow of NaCl solution in g/s, which is obtained using linear regression analysis of the Fg(t) data of the flow determinations by extrapolation to t=0, L0 is the thickness of the gel layer in cm, d is the density of the NaCl solution in g/cm³, A is the area of the gel layer in cm², and WP is the hydrostatic pressure over the gel layer in dyn/cm².

EXAMPLES

Production of the Base Polymers

Example 1 (Comparative Example)

A continuous kneading reactor with two shafts of the List ORP 10 Contikneter type (LIST AG, Arisdorf, Switzerland) was heated constantly to 95° C. on the jacket and on both shafts over the entire experimental duration. The kneader shafts were operated at 40 rpm and 10 rpm respectively. The throughput of monomer solution was 39.343 kg/h (mixture of 31.913 kg/h of a 37.3% by weight aqueous sodium acrylate solution, 3.682 kg/h of acrylic acid and 3.748 kg/h of demineralized water). The monomer solution was inertized with nitrogen and had a temperature of 23° C. Additionally added to the monomer solution via a T-piece upstream of the reactor was a mixture of 46.0 g/h of 3-tuply ethoxylated glyceryl triacrylate and 413.9 g/h of acrylic acid, and also 88.1 g/h of a 15% by weight aqueous sodium persulfate solution and 26.4 g/h of a 1.0% by weight aqueous hydrogen peroxide solution. After ¼ of the length of the kneading reactor (corresponds to 25% of the average residence time), a nozzle was used to meter in 81.9 g/h of a 0.5% by weight aqueous ascorbic acid solution.

The polymer gel discharged was cooled to about 60° C., distributed in portions each of 1000 g homogeneously over 473 cm² of a metal grid and dried in a forced air drying cabinet at 175° C. for 90 minutes. Subsequently, the dried polymer gel was dried by means of an LRC 125/70 roll mill (Bauermeister Zerkleinerungstechnik GmbH, Norderstedt, Germany) with successive gap width settings of 1000 μm, 600 μm and 400 μm. The water-absorbing polymer particles were sieved and the resulting sieve fractions were blended so as to obtain the following particle size distribution:

>710 μm 0% by weight
710-600 μm 13.3% by weight
500-600 μm 23.3% by weight
300-500 μm 43.6% by weight
150-300 μm 19.8% by weight
<150 μm 0% by weight.

The resulting mixture is homogenized in a 5 l metal vessel in an ELTE 650 ST drum hoop mixer (Engelsmann AG, Ludwigshafen, Germany).

The resulting water-absorbing polymer particles were analyzed. The results are summarized in Table 1.

Example 2 (Comparative Example)

The procedure was as in example 1. In addition, 237.9 g/h of urea were dissolved in the monomer solution.

The resulting water-absorbing polymer particles were analyzed. The results are summarized in Table 1.

Example 3

The procedure was as in example 1. In addition, during the polymerization, after ¾ of the length (corresponds to 75% of the average residence time) of the kneading reactor, a nozzle was used to spray 732 g/h of a 32.5% aqueous urea solution onto the polymer gel.

The resulting water-absorbing polymer particles were analyzed. The results are summarized in Table 1.

Example 4 (Comparative Example)

The procedure was as in example 1. In addition, during the polymerization, after ¾ of the length (corresponds to 75% of the average residence time) of the kneading reactor, a nozzle was used to spray 3366.2 g/h of a 20.0% aqueous urea phosphate solution onto the polymer gel.

The resulting water-absorbing polymer particles were analyzed. The results are summarized in Table 1.

TABLE 1

Summary of the base polymers (all values corrected for residual moisture content)

| Example | CRC [g/g] | AUL0.3psi [g/g] | Moisture content [% by wt.] | Extractables [% by wt.] |
|---|---|---|---|---|
| 1*) | 38.9 | 8.8 | 3.3 | 16.0 |
| 2*) | 39.1 | 8.8 | 2.5 | 17.3 |
| 3 | 37.7 | 9.1 | 3.2 | 15.3 |
| 4*) | 34.9 | 11.3 | 2.7 | 15.7 |

*)comparative example

Surface postcrosslinking of the base polymers:

Example 5 (Comparative Example)

1200 g of the base polymer from example 1 were coated in a Pflugschar® M5 plowshare mixer with heating jacket (Gebr. Lödige Maschinenbau GmbH, Paderborn, Germany) at 23° C. and a shaft speed of 200 rpm by means of a two-substance spray nozzle with the following solution (based in each case on the base polymer):

0.992% by weight of isopropanol
0.07% by weight of N-(2-hydroxyethyl)-2-oxazolidinone
0.07% by weight of 1,3-propanediol
0.248% by weight of demineralized water
0.70% by weight of 1,2-propanediol
2.72% by weight of 22% by weight aqueous aluminum lactate solution
0.20% by weight of 22% by weight aqueous sorbitan monococoate solution After the spray application, the shaft speed was reduced to 50 rpm and the product was brought to a product temperature of 185° C. by increasing the temperature of the heating jacket (temperature of the heating liquid 238° C.). About 20 g were taken from the reaction mixture every 5 minutes, beginning with the attainment of the product temperature of 185° C. The samples were each allowed to cool to 23° C. and sieved to <710 μm.

The resulting surface postcrosslinked water-absorbing polymer particles were analyzed. The results are compiled in table 2 and FIG. 1.

Example 6 (Comparative Example)

The procedure was as in example 5, except that 1200 g of the base polymer from example 2 were used.

The resulting surface postcrosslinked water-absorbing polymer particles were analyzed. The results are compiled in table 2 and FIG. 1.

Example 7

The procedure was as in example 5, except that 1200 g of the base polymer from example 3 were used.

The resulting surface postcrosslinked water-absorbing polymer particles were analyzed. The results are compiled in table 2 and FIG. 1.

Example 8 (Comparative Example)

The procedure was as in example 5, except that 1200 g of the base polymer from example 4 were used.

The resulting surface postcrosslinked water-absorbing polymer particles were analyzed. The results are compiled in table 2 and FIG. 1.

TABLE 2

Composition of the surface postcrosslinked base polymers

| Example | Time [min] | SFC [$10^{-7}$ cm$^3$s/g] | CRC [g/g] | AUL0.7psi [g/g] | FSR [g/gs] |
|---|---|---|---|---|---|
| 5*) | 25 | 0 | 33.8 | 16.4 | 0.23 |
|  | 30 | 32 | 30.8 | 23.0 | 0.22 |
|  | 35 | 62 | 29.6 | 23.6 | 0.20 |
|  | 40 | 120 | 27.3 | 24.2 | 0.16 |
|  | 45 | 169 | 25.8 | 23.4 | 0.16 |
|  | 50 |  | 25.4 | 22.8 | 0.15 |
|  | 55 |  | 23.7 | 22.1 | 0.15 |
|  | 60 |  | 22.4 | 21.6 | 0.15 |
| 6*) | 25 | 0 | 35.6 | 10.3 | 0.33 |
|  | 30 | 0 | 33.1 | 17.6 | 0.29 |
|  | 35 | 29 | 31.4 | 22.7 | 0.28 |
|  | 40 | 45 | 30.6 | 24.1 | 0.26 |
|  | 45 | 53 | 28.7 | 24.4 | 0.24 |
|  | 50 | 73 | 28.5 | 24.3 | 0.25 |
|  | 55 | 79 | 27.4 | 23.6 | 0.25 |
|  | 60 | 90 | 24.8 | 23.1 |  |
| 7 | 25 |  | 33.8 | 12.9 | 0.33 |
|  | 30 |  | 32.2 | 19.9 | 0.35 |
|  | 35 | 27 | 30.8 | 23.9 | 0.25 |
|  | 40 | 65 | 30.0 | 24.3 | 0.26 |
|  | 45 | 73 | 27.9 | 23.6 | 0.25 |
|  | 50 | 94 | 27.0 | 23.4 | 0.23 |
|  | 55 | 114 | 26.5 | 23.5 | 0.22 |
|  | 60 | 128 | 26.5 | 23.0 | 0.21 |
| 8*) | 25 |  | 31.2 | 14.8 | 0.29 |
|  | 30 |  | 29.3 | 19.4 | 0.29 |
|  | 35 | 45 | 27.6 | 20.3 | 0.26 |
|  | 40 | 85 | 26.5 | 21.1 | 0.24 |
|  | 45 | 103 | 26.1 | 20.9 | 0.22 |
|  | 50 | 144 | 24.5 | 20.2 | 0.21 |
|  | 55 |  | 24.0 | 20.2 | 0.21 |
|  | 60 |  | 23.5 | 19.9 | 0.21 |

*)comparative example

In FIG. 1, the empty circles (example 5), triangles (example 6), squares (example 7) and rhombuses (example 8) each denote the permeability (SFC), and the filled circles (example 5), triangles (example 6), squares (example 7) and rhombuses (example 8) each denote the free swell rate (FSR).

The invention claimed is:

1. Water-absorbing polymer particles having a centrifuge retention capacity (CRC), a free swell rate (FSR), and a permeability (SFC) which meet the conditions $$FSR\ (g/gs) \geq 0.01 \cdot CRC\ (g/g) - 0.08$$

and $$SFC(10^{-7} \cdot cm^3 s/g) \geq 11000 \cdot \exp(-0.18 \cdot CRC(g/g)).$$

2. Water-absorbing polymer particles according to claim 1, wherein the water-absorbing polymer particles have a centrifuge retention capacity (CRC) of at least 26 g/g.

3. Water-absorbing particles according to claim 2, wherein the water-absorbing polymer particles have a free swell rate (FSR) of at least 0.2 g/gs.

4. Water-absorbing particles according to claim 2, wherein the water-absorbing polymer particles have a permeability (SFC) of at least $80 \times 10^{-7}$ cm$^3$s/g.

5. Water-absorbing particles according to claim 3, wherein the water-absorbing polymer particles have a permeability (SFC) of at least $80 \times 10^{-7}$ cm$^3$s/g.

6. Water-absorbing polymer particles according to claim 1, wherein the water-absorbing polymer particles have a free swell rate (FSR) of at least 0.2 g/gs.

7. Water-absorbing polymer particles according to claim 1, wherein the water-absorbing polymer particles have a permeability (SFC) of at least $80 \times 10^{-7}$ cm$^3$s/g.

8. A hygiene article comprising water-absorbing polymer particles according to claim 1.

\* \* \* \* \*